March 19, 1935.  C. L. VAN INWAGEN, JR  1,994,674
CABLE GRIP
Filed Sept. 1, 1933
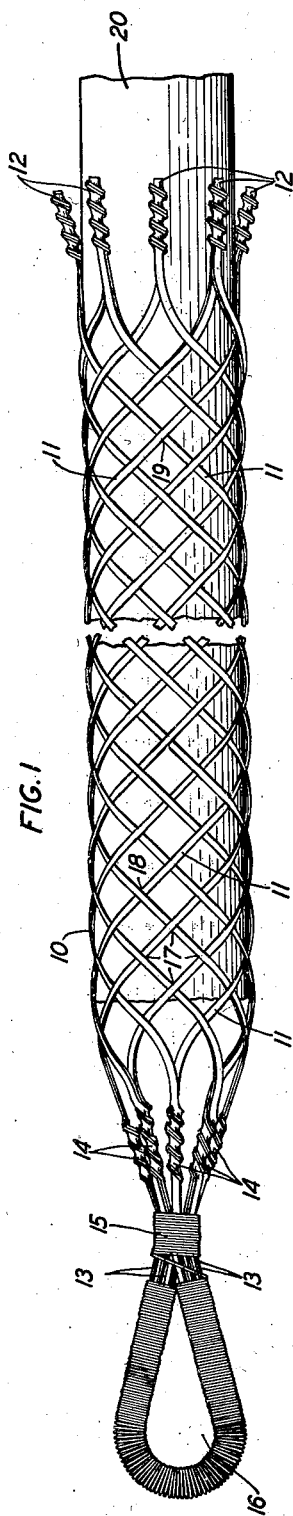
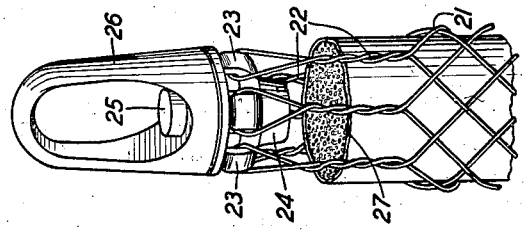
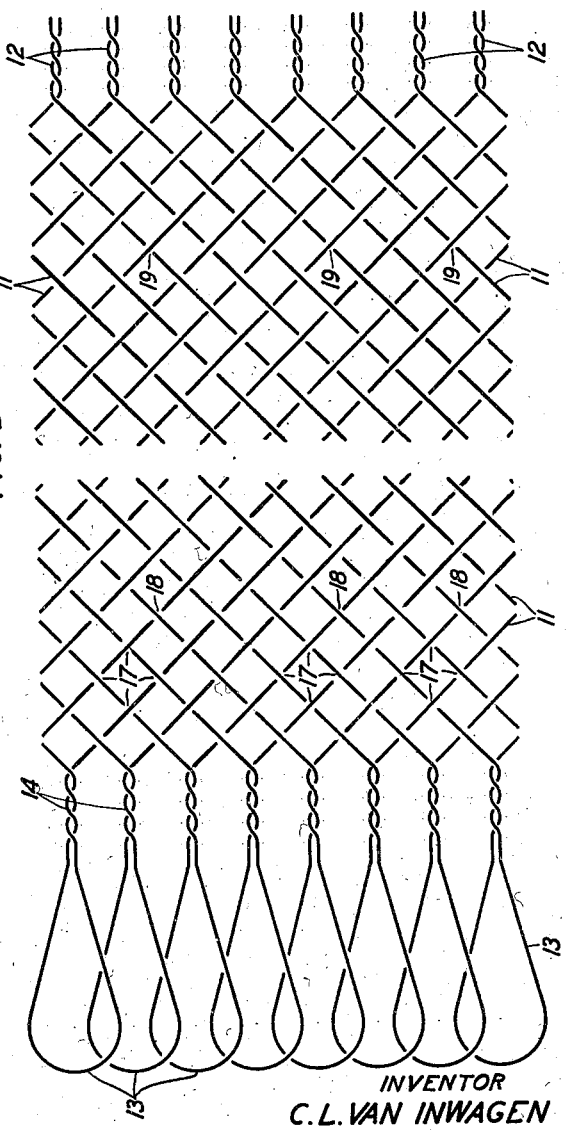
INVENTOR
C. L. VAN INWAGEN JR.
BY J. MacDonald
ATTORNEY Patented Mar. 19, 1935

1,994,674

UNITED STATES PATENT OFFICE 1,994,674

CABLE GRIP

Charles L. Van Inwagen, Jr., Rutherford, N. J., assignor to Bell Telephone Laboratories, Incorporated, New York, N. Y., a corporation of New York Application September 1, 1933, Serial No. 687,838

7 Claims. (Cl. 24—123)

This invention relates to cable grips and more particularly to a cable grip which is used for pulling lead covered cables through underground ducts and through cable rings which are secured to an overhead supporting strand, and particularly to cable grips in which the strands of wire or other suitable material are woven in tubular form for longitudinal extension and contraction whereby the diameter will be reduced when extended and increased when contracted so as to respectively grip and release the cable or other objects engaged thereby. In the manufacture of cable grips of this type, it has been customary to weave the strands in tubular basket form from the draft end toward the open end of the grip, so that the wires which form the grip overlie and underlie each other.

The object of this invention is to provide a cable grip which will provide a larger area of contact between the cable grip and the cable sheath than has heretofore been obtained in grips of this general type.

A still further object of this invention is the provision of a gripping device which due to its novel construction, is only half the length of the cable grips commonly employed.

A still further object of the invention is the provision, at the draft end of the cable grip, of a means rotatably secured to the grip for fastening the pulling line thereto.

A feature of this invention is the manner in which the free ends of the wires in the cable grip are secured together.

In my improved cable grip, I provide instead of the usual round wires, wires having a substantially rectangular cross-section which are woven over and under one wire for three spaces beginning at the draft end and then over and under two wires for the body of the grip and then at the open end over and under one wire for three spaces again. This construction provides a cable grip which presents a large area of contact to the surface of the cable sheath thereby creating a greater friction between the grip and the cable sheath than has heretofore been obtainable. With this construction, due to the greater holding power of the grip, a much shorter grip may be used, and therefore a smaller section of the cable is deformed.

Furthermore, this construction of the cable grip provides a grip which has no obstruction which would prevent it from passing readily through cable rings or overhead construction, or through the tile ducts on underground construction.

Applicant has found that by the use of flat wires he has obviated the necessity of securing the free ends of the wires together by any outside means, since by the mere twisting of these two wires together, he obtains an interlock between these wires which requires no further treatment such as welding, brazing or soldering to prevent them from coming apart.

Referring now to the drawing:

Fig. 1 is a plan view of the cable grip in position around the lead covered cable;

Fig. 2 is a diagrammatic view illustrating how the wires in the cable grip shown in Fig. 1 are woven; and Fig. 3 is a modified form of pulling head.

As illustrated in Figs. 1 and 2, applicant's improved gripping device comprises a multiplicity of strands 11 of wire or some other suitable material having preferably a rectangular cross-section, interlaced or interwoven about a common axis to form the tubular body 10.

These flat wire strands 11, are extended continuously from the cable receiving end to the draft end of the body 10 and then returned to the cable receiving end where they are twisted together to form a union therebetween as shown at 12. The strands 11 at the draft end of the body 10 form return bands or loops 13, as shown in Figs. 1 and 2, each loop portion 13 being twisted about itself as shown at 14. The loop portions 13 are bunched together and tightly wrapped with wire 15 to form the single loop 16.

As shown in Figs. 1 and 2, the flat wire strands 11 are woven in the conventional way, that is, over one and under one wire as shown at 17. This basket weave is carried out for approximately three spaces, and beginning at the point 18, the wires are then woven over two and under two wires for the body of the grip 10 until three spaces from the cable receiving end or at the point 19 where they are again woven over one and under one where each pair of wires 11 terminate in the twisted end portions 12.

Due to the rectangular cross-section of the wires 11, these wires when twisted together as shown at 12, will interlock with each other and due to this interlocking need no additional means for securing them together.

As shown in Fig. 1, due to the weaving of the wire strand 11, that is, over two and under two for the major portion of the grip 10, the area of contact between the wires 11, of the grip 10, and the surface of the cable 20 is greatly increased thereby not only increasing the holding power of the grip, but due to this increased holding power a much shorter grip may be used, consequently deforming a very small amount of cable, this results in a considerable saving and reduces the cost of cable installations.

In Fig. 3 a modified form of pulling head is provided, the body of the grip 21 is woven in the same way as the grip shown in Fig. 1, but the loops 22 instead of terminating in a bunched arrangement, as shown in Fig. 1, are each separated from each other and are secured over the projecting ears 23 which are cast integral with the member 24. Pivotally connected to the top portion of the member 24, by means of the stud 25, is an eye member 26, this eye member is free to rotate on the stud 25 independently of the member 24 and the grip 21.

This modified type of pulling head allows the pulling line to be rotated without twisting or deforming the cable and also prevents the twisted portion 22 of the grip from biting into the cable edge at the point 27. This is due to the spreading action of the hooks 23 and the member 24 which hold these loop portions in alignment.

The construction shown and described is particularly simple and efficient, both in construction and operation, but obviously various changes may be made in the detailed construction without departing from the spirit of the invention and therefore I do not wish to limit the invention to the construction as shown and described but only to be limited by the appended claims.

What is claimed is:

1. A cable grip composed of wire strands inter-laced about a common axis, said strands being woven over one wire and under one wire a short distance from each end of said grip, the intermediate portion of said grip being woven over two wires and under two wires, said wires extending continuously from the cable receiving end to the draft end and returned to the cable receiving end to be secured together.

2. A cable grip composed of flat wire strands interlaced about a common axis, said strands being woven over one wire and under one wire a short distance from each end of said grip, the intermediate portion of said grip being woven over two wires and under two wires, said wires extending continuously from the cable receiving end to the draft end and returned to the cable receiving end to be secured together.

3. A cable grip composed of flat wire strands interlaced about a common axis, a portion of said grip being woven over one wire and under one wire, and a portion woven over two wires and under two wires, said wires extending continuously from the cable receiving end to the draft end to form loops which are bunched together and wrapped with wires to form a looped portion and returned to the cable receiving end to be secured together.

4. A cable grip composed of flat wire strands interlaced about a common axis, a portion of said grip being woven over one wire and under one wire, and a portion woven over two wires and under two wires, said wires extending continuously from the cable receiving end to the draft end to form loops and returned to the cable receiving end to be secured together, a member having projecting ears thereon engaging said loop and an eye member rotatably mounted on said first member.

5. A cable grip composed of wire strands interwoven upon a common axis, a portion of said grip being woven over one wire and under one wire and a portion woven over two wires and under two wires, said wires extending continuously from one end of the cable grip to the other.

6. A cable grip composed of wire strands interwoven upon a common axis, a portion of said grip being woven over one wire and under one wire and a portion woven over two wires and under two wires, said wires extending continuously from one end of the cable grip to the other and return, to form loops at one end of the cable grip.

7. A cable grip composed of flat wire strands interwoven about a common axis, said wire strands extending continuously from one end of the cable grip to the other and return, to form a plurality of loops at one end of the grip, a member having projecting ears thereon engaging said loops, and an eye member rotatably secured to said first member.

CHARLES L. VAN INWAGEN, Jr.